Aug. 18, 1936.  A. DRECHSEL  2,051,078

MOTOR CAR WITHOUT ROTARY SWINGING MOVEMENT

Filed May 9, 1931  2 Sheets-Sheet 1

Inventor:
ARMIN DRECHSEL
his ATTY.

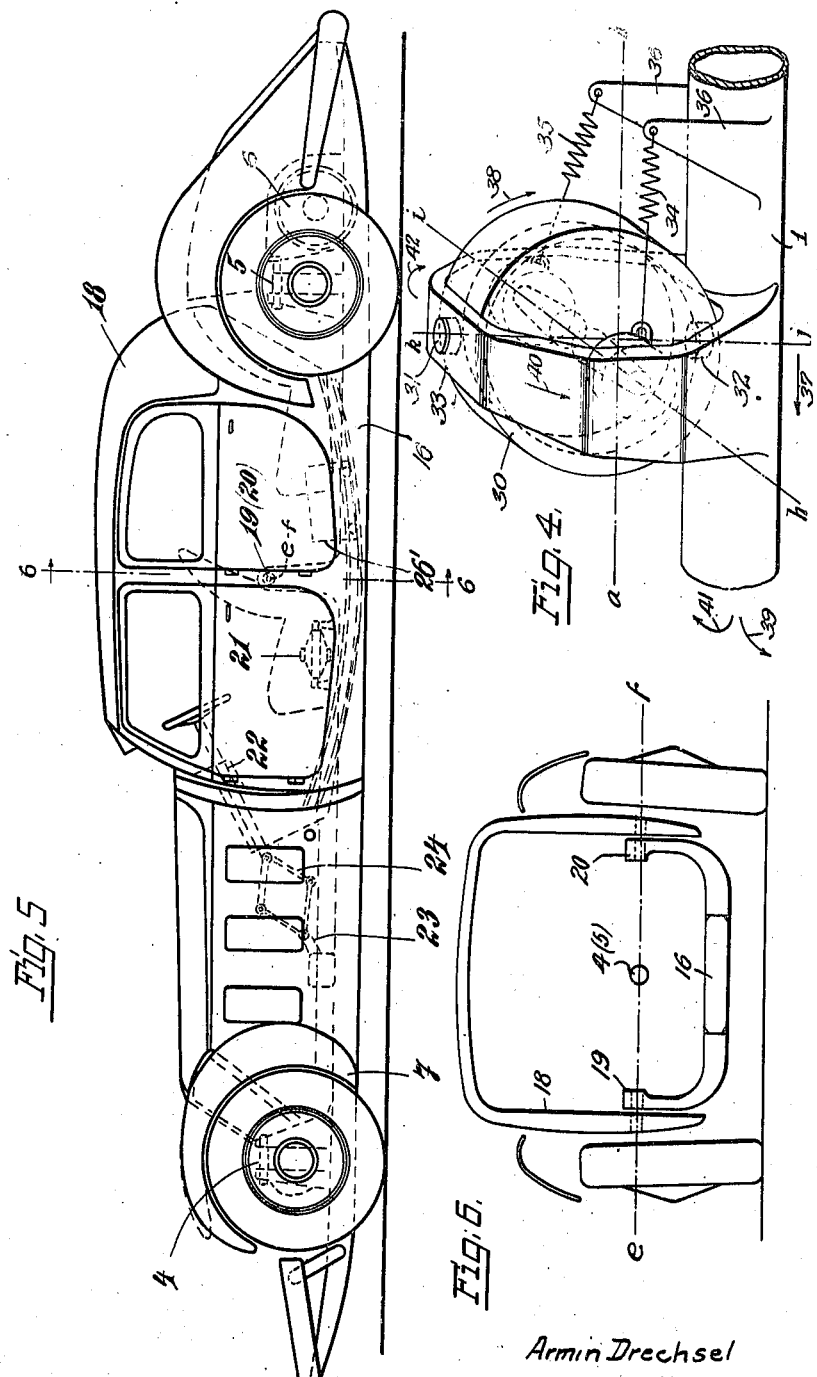

Patented Aug. 18, 1936

2,051,078

UNITED STATES PATENT OFFICE 2,051,078

MOTOR CAR WITHOUT ROTARY SWINGING MOVEMENT

Armin Drechsel, Munich, Germany

Application May 9, 1931, Serial No. 536,250
In Germany May 10, 1930

11 Claims. (Cl. 180—1)

This invention relates to wheeled vehicles and, more particularly, to double track vehicles in which angular movements taking place about a horizontal axis are eliminated or diminished by means of gyroscopic stabilizers, said movements being produced by uneven roads and other causes. Particularly, angular movements about the longitudinal and transverse axes of the car are avoided by the present invention and as a consequence, the general properties of the car are improved.

It has already been known to reduce oscillations and rotary movements of the resiliently supported frame and car body by means of the stability or inertia of one or more gyroscopes having two degrees of play and forming a so-called gyroscopic stabilizer.

Double track vehicles, i. e., vehicles with four, six, eight or higher even number of wheels which, divided into two groups, support the two halves of the vehicle, which have been constructed heretofore and provided with gyroscopic stabilizers utilize spring suspensions of the generally known types.

It has been found, however, that it is very difficult to stabilize by means of gyroscopic stabilizers double track cars of standard spring construction. The reason for this is that the torques are so high that a very voluminous gyroscopic stabilizer would be necessary.

The present invention proceeds on the presumption that a reduction in the weight and size of the gyroscopic appliance and an increased utilization of the constructional possibilities offered by the use of gyroscopes may most effectively be obtained if the car frame suspension and the spring arrangement of the car are suited to the gyroscope equipment. Therefore, the parts of the car to be gyroscopically stabilized are in their entirety suspended from those car parts by which the first-mentioned parts are supported. The suspension is effected by means of a connection allowing easy swivelling. The axis or axes of the connection are within the vertical plane comprising the center of gravity of the gyroscopically stabilized car parts and extend in the direction of the axis of stabilization.

The present invention further consists in a new construction of other details of a car which are necessary in order effectively to realize the aforementioned purpose and to produce advantageous results in the operation of such a car.

Various embodiments of the present invention have been suggested, including suitable connections for stabilizing a car by means of gyroscopic equipment against rotary movements of the car axles either in an angular direction about the longitudinal axis (tipping movements) or against angular movements about the cross-axis (rocking movements), or against the angular movements about both axes.

With this general statement of the object and purpose of the present invention I will now proceed to describe the embodiments thereof and the manner in which my invention is carried out. It will be understood that while I have described what may be considered as a preferred embodiment of my invention, I do not limit myself to the precise conditions or proportions herein set forth, as these may be varied by those skilled in the art, depending on their intended use and the operating conditions.

The different embodiments of my invention involving the suspension and the stabilization of the car body and its parts are described in the following specification, set forth in the appended claims and exemplified in the accompanying drawings, in which:

Fig. 4 is a perspective view of a gyroscopic stabilizing arrangement and its connection to a part of the car;

Fig. 5 is a side elevation of a complete car embodying the various features of my invention; and Fig. 6 is a transverse section of the car taken on lines 6—6 of Fig. 5.

It will be understood, of course, that only such parts are shown in these drawings as are necessary to explain the invention, many of the details of vehicle construction being omitted.

Figure 1:
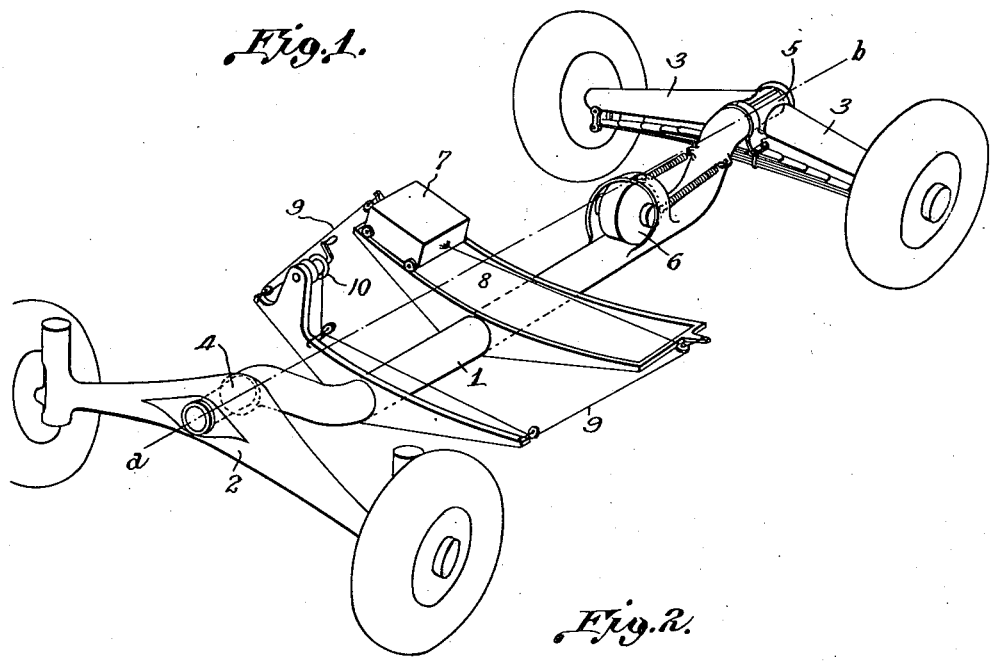
Fig. 1 is a perspective view of a resiliently supported chassis equipped with a gyroscopic stabilizer for stabilizing about the longitudinal axis, and a device for shifting the weight to act as counterbalance for shifting loads.
Figure 2:
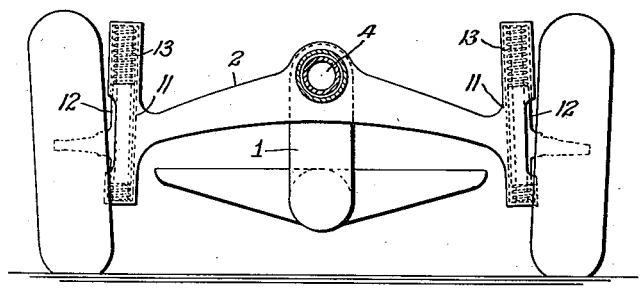
Fig. 2 is the front end view of the said chassis, showing also the transverse section of the connection by which the axle is mounted to the frame.
Figure 3:
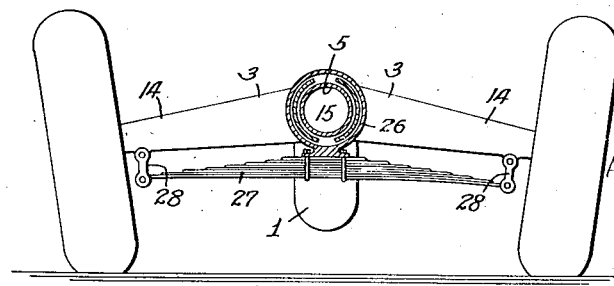
Fig. 3 is the rear end view of the chassis, showing also the transverse section of the connection by which the rear axle is mounted on the frame.

Referring to the drawings, and particularly to Figs. 1, 2 and 3, which illustrate the preferred embodiment, the angular movements of the whole car body, i. e., the frame with all parts mounted thereon, such as the body, the machine equipment, etc., about the longitudinal axis, are eliminated. The body fastened to the car frame, as well as the machine equipment, have been omitted from the drawings for the sake of showing otherwise hidden parts.

1 denotes a car frame of the so-called "tube" type which, towards its center, is cranked downwardly, whereby the front and rear ends have an unusually high position. The frame is pivotally mounted by means of horizontal journals constituted by bearings 4 and 5 in alignment with the longitudinal axis a—b of the car. These bearings are in the middle of the car axles 2 and 3. Therefore, the bearings as well as the center of gravity of the frame, body, machine equipment, etc., are within a common vertical plane. The car axles protect the wheels from lateral tipping without transmission of forces set up by the tipping onto the frame of the car. The reactions caused by acceleration, as well as by retardation, are held by the bearings 4 and 5. The latter insure also the correct operating position of the axles.

In the present case, the car axles are of the independent type. The front axle 2 has telescope spring supporting elements of the type used in Lancia cars. At the ends of the cross-piece 2 the telescopes 11, 11, comprising spiral springs 13, 13, are provided resiliently to support the naves 12, 12. The bearing 4 is arranged in the middle of the rigid cross piece. The whole frame with its parts is rotatably carried by the bearing and is free to swing about its longitudinal axis. The rear axle 3 consists of two independently swinging half axles 14, 14. These half axles swing, as in the Tatra car, by means of the arched surfaces 15, 15, about a common bearing disposed axially in the longitudinal axis of the car. The two half axles 14, 14 are supported by the transverse leaf spring 27 which is connected to the half axles by the swinging levers 28, 28. The transverse spring is not stationary in its middle portion, differing in this respect from known constructions, but is rotatably connected to the journal 5 by the ring 26.

In this arrangement the car body is so suspended that the center of gravity (the common center of gravity of frame, machine equipment, body, fuel, persons, loads and all other weights in and on the car except wheels and car axles), is disposed below the axis running through the points of suspension. In addition to the considerable cranking of the frame and the high position of the suspension points, the location of the center of gravity below the suspension axis a—b may be effected also by using a horizontal engine, as well as by the effect of the weight of the gyroscopic device and the weight of the generator and the storage batteries necessary for the operation of the gyroscope.

The constructional details of stabilizing gyroscopes are well known and it is equally well known that the precession axis and the rotation axis (the latter only in raised position, i. e., in non-precessional position), must lie in the plane which is vertically cut or crossed by what is called the "axis in the space" about which the angular movements take place.

In Fig. 1 such a stabilizing device is shown consisting of but a single gyroscope having two degrees of play; the gyroscope 6 has a horizontal axis of rotation and a vertical axis of precession and is attached to the car frame in a manner to protect the car frame against angular movements about the longitudinal axis.

The operation of the car is as follows:

When the car passes over an impediment on the road, the car axles 2 and 3 are angularly moved about the longitudinal axis of the car. However, on account of the rotary freedom of bearings 4 and 5, they do not transmit any angular momentum to the frame about the longitudinal axis except insignificant torques caused by the frictional resistance of the bearing. Therefore, the small gyroscope 6 easily prevents swinging or tipping of the frame. Since the center of gravity of the frame and its parts is below the suspension axis a—b, the frame tends to maintain an upright position in spite of all tipping influences. This is important since the gyroscope has merely a temporary stabilizing effect, like the effect of a very powerful momentum of inertia. Therefore, continuously acting torques would force the frame out of its position if the frame were suspended in an unstable or indifferent equilibrium. The pendulum stable car body tends to take an upright position of itself and irrespective whether the gyro-stabilizing device is in operation or not. The frame will maintain its upright position even with a laterally inclined or sloping carriage way.

On a curve the centrifugal force exerts a turning effect on the frame and tilts the latter. Unlike customary cars, the upper part of the car is inclined to the inside of the curve, because the center of gravity is below the axis of suspension. The car inclines with every phase of swinging until the torque of the centrifugal force and the torque of the gravity counterbalance one another. The occupants will not feel the effect of the centrifugal force, because their bodies are not subjected to lateral displacement. This effect is present whether the curve is even or banked inwardly or outwardly. When driving through a curve, the gyro-stabilizer eliminates quick angular movements of the frame about the longitudinal axis. After passing the curve, the frame swings back into the upright position, because it behaves like a pendulum.

Known gyroscopic arrangements without means for the acceleration of the precession would prevent the pendulum-like inclination of the car body towards the inner side of the curve.

I shall now point out how a simple gyro-stabilized device comprising a single gyroscope must be mounted on a car with a pendulum stable suspended body in order to avoid any retardation in the inclination movement of the car body towards the inside of the curve. This point is explained in connection with the construction illustrated in Fig. 4.

This figure shows a gyro-stabilizer having a vertical axis of precession j—k; the horizontal axis of rotation h—i being disposed in non-precessional position transversely to the longitudinal axis of the car a—b. The whole stabilizer 30 is disposed oscillatably about the precession axis j—k by means of vertical pins 31 and 32. The top and the bottom pin of the casing is secured in a frame 33 on the car frame. The axis of rotation is kept vertically as far as possible to the symmetrical plane of the car by spiral springs 34 and 35. The springs prevent the axis of rotation from turning by more than about 45 degrees with respect to the middle position. The arrow 37 indicates the driving direction of the car when traveling forward. The arrow 38 denotes the direction of rotation of the stabilizing rotor which is contrary to that of the car wheels when traveling forward.

The gyro-stabilizing device operates as follows:

If the car takes a left curve in the direction of the arrow 39, owing to the movement of the car about the axis *j—k*, the spring 34 exerts a stress on the left side of the stabilizer and the latter is turned in the same sense as the car, i. e., in the direction of arrow 39 about the axis *j—k*. The law of the homologous parallelism applies to the additional rotation of rotating bodies. This law is as follows:

The gyroscope tends to adjust its axis of rotation along the shortest way parallel to the axis of rotation of the momentum acting upon the gyroscope, whereby the precession taking place in that direction in which the direction of the couple of forces coincides with the direction of rotation.

It will be seen from this law that in the left curve the gyroscope 30 transforms the rotary momentum, turning the gyroscope in the sense of arrow 39 about the axis *j—k* into a rotary momentum producing its own inclination to the left in the direction of the arrow 40 about the longitudinal axis *a—b*. The precession axis of the gyroscope 30 is solidly attached to the car frame. Therefore, the car body also inclines in the direction of the arrow 40. The inclination to which the car body is subjected by the gyroscope during the left curve is, except for its direction, identical with the inclination which the car body performs during the left curve owing to its pendulum action. The inclination towards the curve is not hindered by the gyro-stabilizer 30, although the gyro-stabilizer may stabilize during the curve. When the curve is passed the gyroscope tends to right the car body under the action of the spring 35. In case of right-hand curves, the reverse operations take place; if the car and the gyroscope are turned in the sense of the arrow 41, the gyroscope and the car body are synchronously inclined in the direction of the arrow 42 and are subsequently synchronously righted.

If a person is seated on one side of the car, the car body tilts strongly to one side. A further feature of the present invention eliminates the inclining influence of uni-lateral overloads.

Fig. 1 illustrates an example of such device. Equilibrium is maintained in this construction in the case of an uni-lateral overload by the displacement of a weight towards that side of the car which is not loaded. The weight 7, for example the storage battery, is slidable transversely on the track 8 and is controlled by means of ropes 9 and a winch 10 from the instrument board of the car.

The bearings 4 and 5 may be slide bearings, ball bearings, roller bearings, or the like. The car axle may be attached by two or more bearings or joints which are axially or substantially axially mounted. The car axles may be divided into two parts and each connected to the car frame or car body by means of bearings or joints which permit turning about an axis parallel or substantially parallel with the longitudinal axis of the car. The car axles may also be attached by means of ball joints, elastic joints and other suitable joints. The principal requirements are that the car axles perform free or substantially free angular movements about axes parallel or substantially parallel with the longitudinal axis of the car, and that the necessary control of the wheels and the supports of the car body be safely taken care of by the car axles.

In Figs. 5 and 6 a car is shown, by way of example, in which the rocking movements are eliminated. The car axles are connected by means of freely movable joints 4 and 5 to the frame 16 which by means of the gyro-stabilizing device 6, is protected against angular movements about the longitudinal axis. The body 18 is rotatable about the cross-axle *e—f* and is suspended from the arms 17 mounted in bearings 19 and 20 so as to establish either pendulum stable, indifferent or unstable equilibrium. A gyro-stabilizing device 21 comprising one or several gyro-stabilizers and adapted for the desired condition of the body, protects the body against rotary movement arising from angular movements about the cross-axle. In addition a weight 26' which is longitudinally displaceable allows equal weight distribution with respect to the front and the rear of the car.

If the driver's seat is inside the body, then the action of the steering wheel as well as of the other control instruments of the car must be transmitted from the non-swinging body to the car frame which is subjected to the angular movements about the cross-axle. The shaft carrying the steering wheel must in such a case be subdivided into three interconnected parts 22, 23 and 24 which are movable with respect to one another and which comprise two universal joints, the middle part thereof being adapted to telescope. The transmission of any other operation, e. g., gas control, or the actuation of the brakes may be performed by means of similar mechanical arrangements or by means of a Bowden cable.

With regard to the mode of operation of the car, only the following need be added: if the body 18 which stabilized against angular movements about the cross-axle is suspended in pendulum stable condition when admitting gas and when applying the brakes, a strong momentary braking of the gyroscope or gyroscopes 21 may be effected in the precessional axis momentarily to reduce the stabilizing effect with respect to the cross-axle *e—f* and in order that the body 18 may take the position resulting from gravitation and acceleration momentums or rather gravitation and retardation momentums. In this manner is the object attained that the undesirable shocks resulting from the acceleration of the car or the action of the brakes are not felt at all by the occupants.

I claim:

1. In a wheeled vehicle, a car body, a rigid frame to carry the car body, transversely disposed axles rotatably mounted centrally thereof on the ends of the frame, a gyroscope carried by said frame to maintain the latter in a position of equilibrium on the axles, and means adjustable laterally of the car body to act as a counterbalance for shifting loads carried therein.

2. A wheeled vehicle, as claimed in claim 1, in which said last named means comprises a weight, a track over which the weight is adapted to run, and means for shifting the weight along said track.

3. A double track wheeled vehicle comprising a supporting frame, a transversely disposed wheel support having spring means for resiliently carrying said frame, an oscillatable fulcrum interconnecting said wheel support and said frame, the fulcrum point being situated in the symmetrical plane of the vehicle, the oscillation of the wheel support about the fulcrum point being directed about a longitudinal axis of the vehicle, said fulcrum having a bearing element allowing easy oscillation of said wheel support and said spring means about the said axis in relation to the supporting frame, an adjustable device on said frame allowing to counterbalance the inclining influence of unilateral loads carried therein, and a gyroscopic device on said frame for stabilizing the same about the longitudinal axis of the vehicle.

4. A double track wheeled vehicle comprising a supporting frame, transversely disposed wheel supports having spring means for resiliently carrying said frame, oscillatable fulcrums interconnecting said wheel supports and said frame, the fulcrum points being situated in the symmetrical plane of the vehicle, the oscillation of the wheel supports about the fulcrum points being directed about longitudinal axes of the vehicle, said fulcrums having bearing elements allowing easy oscillation of said wheel supports and said spring means about the said axes in relation to the supporting frame, an adjustable device on said frame allowing to counterbalance the inclining influence of unilateral loads carried therein, and a gyroscopic device on said frame for stabilizing the same about the longitudinal axis of the vehicle.

5. A double track wheeled vehicle comprising a body, a supporting frame therefor, a transversely disposed wheel support having spring means for resiliently carrying the body and frame, an oscillatable fulcrum interconnecting said wheel support and said frame, the fulcrum being situated in the symmetrical plane of the vehicle, the oscillation of the wheel support about the fulcrum point being directed about a longitudinal axis of the vehicle, said fulcrum having bearing element allowing easy oscillation of said wheel support and said spring means about the same axis in relation to the supporting frame, the center of gravity of the frame and body assembly being lower than the fulcrum point, an adjustable device on said frame allowing to counterbalance the inclining influence of unilateral loads carried therein, and a gyroscopic device on the frame and body assembly for stabilizing the same about the longitudinal axis of the vehicle.

6. A double track wheeled vehicle comprising a body, a supporting frame therefor, transversely disposed wheel supports having springs for resiliently carrying said frame and body, oscillatable fulcrums interconnecting said wheel supports and said frame, the fulcrum points being situated in the symmetrical plane of the vehicle, the oscillation of the wheel supports about the fulcrum points being directed about longitudinal axes of the vehicle, said fulcrums having bearings allowing easy oscillation of said wheel supports and said springs about the said axes in relation to the supporting frame, the center of gravity of the frame and body assembly being disposed below the axis running through the fulcrum points, an adjustable device on the frame and body assembly allowing to counterbalance the inclining influence of unilateral loads carried therein, and a gyroscopic device on the frame and body assembly for stabilizing the same about the longitudinal axis of the vehicle.

7. A double track wheeled vehicle as claimed in claim 3, in which the gyroscopic device comprises a single gyroscope having a normally transversal axis of rotation, a vertical axis of precession and springs for limiting the precession, and the rotation of the flywheel of the gyroscope is directed opposite to the direction of rotation of the vehicle wheels.

8. A double track wheeled vehicle as claimed in claim 4, in which the gyroscopic device comprises a single gyroscope having a normally transversal axis of rotation, a vertical axis of precession and springs for limiting the precession, and the rotation of the flywheel of the gyroscope is directed opposite to the direction of rotation of the vehicle wheels.

9. A double track wheeled vehicle as claimed in claim 5, in which the gyroscopic device comprises a single gyroscope having a normally transversal axis of rotation, a vertical axis of precession and springs for limiting the precession, and the rotation of the flywheel of the gyroscope is directed opposite to the direction of rotation of the vehicle wheels.

10. A double track wheeled vehicle as claimed in claim 6, in which the gyroscopic device comprises a single gyroscope having a normally transversal axis of rotation, a vertical axis of precession and springs for limiting the precession, and the rotation of the flywheel of the gyroscope is directed opposite to the direction of rotation of the vehicle wheels.

11. A wheeled vehicle as claimed in claim 3, in which said adjustable device comprising a weight is provided on the vehicle body, a track over which the weight is adapted to run, and means for shifting the weight along said track to counter-balance shifting loads carried in the vehicle.

ARMIN DRECHSEL.